(12) United States Patent
Zhou et al.

(10) Patent No.: US 10,974,600 B2
(45) Date of Patent: Apr. 13, 2021

(54) POWER SYSTEM OF ELECTRIC VEHICLE, CONTROL METHOD AND ELECTRIC VEHICLE

(71) Applicant: SUNGROW POWER SUPPLY CO., LTD., Anhui (CN)

(72) Inventors: Peng Zhou, Anhui (CN); Desheng Ning, Anhui (CN); Shuying Yang, Anhui (CN); Hui Wang, Anhui (CN); Weichao Hu, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 16/506,691

(22) Filed: Jul. 9, 2019

(65) Prior Publication Data

US 2020/0016982 A1    Jan. 16, 2020

(30) Foreign Application Priority Data

Jul. 11, 2018    (CN) .......................... 201810757814.8

(51) Int. Cl.
*B60L 3/00* (2019.01)
*B60L 50/60* (2019.01)
(Continued)

(52) U.S. Cl.
CPC .............. *B60L 3/0046* (2013.01); *B60L 1/003* (2013.01); *B60L 15/20* (2013.01); *B60L 50/60* (2019.02);
(Continued)

(58) Field of Classification Search
CPC ........ B60L 3/0046; B60L 50/60; B60L 58/12; B60L 58/20; B60L 1/003; B60L 2220/58;
(Continued)

(56) References Cited

U.S. PATENT DOCUMENTS 9,878,620 B2 *  1/2018  Mitsutani .............. B60L 3/0084
9,963,166 B2    5/2018  Xu et al.
(Continued)

FOREIGN PATENT DOCUMENTS

CN    105584520 A    5/2016
CN    106965701 A    7/2017
(Continued)

OTHER PUBLICATIONS

First Chinese Office Action regarding Application No. 201810757814.8 dated Nov. 4, 2019. Partial translation provided by Unitalen Attorneys at Law.
Extended European Search Report regarding Application No. 19184135.2 dated Dec. 4, 2019.

*Primary Examiner* — Jung Kim
(74) *Attorney, Agent, or Firm* — Harness, Dickey & Pierce, P.L.C.

(57) ABSTRACT

A power system of an electric vehicle, a control method and an electric vehicle are provided. The system includes a high voltage battery, a low voltage storage battery, a main drive motor and an electronic controller therefor powered by the high voltage battery, and an auxiliary drive motor and an electronic controller therefor. The electronic controller of the auxiliary drive motor includes a high voltage electronic controller and a low voltage electronic controller. The low voltage electronic controller is configured to operate in a rotation speed closed loop mode when determining that the high voltage battery fails, and to operate in a torque control mode to charge the low voltage storage battery when the high voltage battery is normal and state of charge of the low voltage storage battery is lower than a first preset value.

15 Claims, 5 Drawing Sheets

(51) Int. Cl.
  *B60L 58/12*    (2019.01)
  *B60L 58/20*    (2019.01)
  *B60L 1/00*     (2006.01)
  *B60L 15/20*    (2006.01)
  *H02P 5/74*     (2006.01)

(52) U.S. Cl.
  CPC ............... *B60L 58/12* (2019.02); *B60L 58/20* (2019.02); *H02P 5/74* (2013.01); *B60Y 2200/91* (2013.01)

(58) Field of Classification Search
  CPC .. B60L 2220/54; B60L 15/007; B60L 3/0007; B60L 2240/547; B60L 15/38; H02P 5/74; B60Y 2200/91; Y02T 10/70; Y02T 10/64; Y02T 10/72
  See application file for complete search history.

(56) References Cited

U.S. PATENT DOCUMENTS

| | | |
|---|---|---|
| 2009/0033253 A1 | 2/2009 | Nagashima et al. |
| 2010/0006360 A1 | 1/2010 | Kishimoto |
| 2017/0106899 A1 | 4/2017 | Xu et al. |

FOREIGN PATENT DOCUMENTS

| | | |
|---|---|---|
| CN | 107472030 A | 12/2017 |
| CN | 107618565 A | 1/2018 |
| CN | 108099636 A | 6/2018 |
| EP | 0645278 A1 | 3/1995 |
| EP | 1947759 A2 | 7/2008 |
| EP | 2873551 A2 | 5/2015 |

\* cited by examiner

POWER SYSTEM OF ELECTRIC VEHICLE, CONTROL METHOD AND ELECTRIC VEHICLE

CROSS REFERENCE TO RELATED APPLICATIONS

This application claims the priority to Chinese patent application No. 201810757814.8, titled "POWER SYSTEM OF ELECTRIC VEHICLE, CONTROL METHOD AND ELECTRIC VEHICLE", filed with the China National Intellectual Property Administration on Jul. 11, 2018, the entire disclosure of which is hereby incorporated by reference.

FIELD

The present disclosure relates to the field of electric vehicle technology, particularly to a power system of an electric vehicle, a control method, and an electric vehicle.

BACKGROUND

A conventional electric vehicle power system mainly includes a high voltage battery, a main drive motor and an auxiliary drive motor both powered by the high voltage battery.

Once the high voltage battery fails, the auxiliary drive motor will stop running instantly, resulting in a great safety risk. Such a high voltage battery failure may cause a difficulty in vehicle steering and/or a vehicle brake failure. This is a great threat to personal safety of passengers and drivers on the vehicle.

SUMMARY

In view of above, a power system of an electric vehicle, a control method, and an electric vehicle are provided according to the present disclosure, so as to avoid an instantaneous stopping of an auxiliary drive motor when a high voltage battery fails.

A power system of an electric vehicle includes a high voltage battery, a low voltage storage battery, a main drive motor and electronic controller for the main drive motor, and an auxiliary drive motor and electronic controller for the auxiliary drive motor, where, the main drive motor and electronic controller for the main drive motor is powered by the high voltage battery;

the auxiliary drive motor includes a high voltage winding and a low voltage winding, the electronic controller of the auxiliary drive motor includes a high voltage electronic controller and a low voltage electronic controller, the high voltage battery and the high voltage winding of the auxiliary drive motor are connected via the high voltage electronic controller of the auxiliary drive motor, and the low voltage storage battery and the low voltage winding of the auxiliary drive motor are connected via the low voltage electronic controller of the auxiliary drive motor; and the low voltage electronic controller of the auxiliary drive motor is configured to;

operate in a rotation speed closed loop mode in response to determining that the high voltage battery fails, and operate in a torque control mode to charge the low voltage storage battery in response to determining that the high voltage battery is normal and state of charge of the low voltage storage battery is lower than a first preset value.

Optionally, the low voltage electronic controller of the auxiliary drive motor may further be configured to stop the torque control mode in response to determining that the high voltage battery is normal and the state of charge of the low voltage storage battery is not lower than the first preset value.

Optionally, the low voltage electronic controller of the auxiliary drive motor may further be configured to stop the torque control mode in response to determining that the high voltage battery is normal and the state of charge of the low voltage is higher than a second preset value, where the second preset value is greater than the first preset value.

Optionally, the low voltage electronic controller of the auxiliary drive motor may be configured to determine that the high voltage battery fails in response to determining that an output voltage of the high voltage battery is out of a preset range.

Optionally, the power system of the electric vehicle may include two sets of the auxiliary drive motors and the electronic controller for the auxiliary drive motors, including a set of oil pump motor and electronic controller for the oil pump motor and a set of air pump motor and electronic controller for the air pump motor, where the two sets of the auxiliary drive motors and the electronic controllers for the auxiliary drive motors operate independently.

An electric vehicle includes any one of the power systems of the electric vehicle described above.

A method for controlling a power system of an electric vehicle, where the power system of the electric vehicle includes a high voltage battery, a low voltage storage battery, a main drive motor and an electronic controller for the main drive motor, and an auxiliary drive motor and an electronic controller for the auxiliary drive motor, where the main drive motor and the electronic controller for the main drive motor is powered by the high voltage battery; the auxiliary drive motor includes a high voltage winding and a low voltage winding; where the electronic controller of the auxiliary drive motor includes a high voltage electronic controller and a low voltage electronic controller, where the high voltage battery and the high voltage winding of the auxiliary drive motor are connected via the high voltage electronic controller of the auxiliary drive motor, and the low voltage storage battery and the low voltage winding of the auxiliary drive motor are connected via the low voltage electronic controller of the auxiliary drive motor;

the method includes:

determining whether the high voltage battery fails or not;

controlling the low voltage controller of the auxiliary drive motor to operate in a rotation speed closed loop mode in response to determining that the high voltage battery fails;

determining whether state of charge of the low voltage storage battery is lower than a first preset value in response to determining that the high voltage battery is normal; and controlling the low voltage controller of the auxiliary drive motor to operate in a torque control mode to charge the low voltage storage battery in response to determining that the state of charge battery of the low voltage storage battery is lower than the first preset value.

Optionally, after the determining whether the state of charge of the low voltage storage battery is lower than the first preset value, the control method may further include:

stopping the torque control mode in response to determining that the state of charge of the low voltage storage battery is not lower than the first preset value.

Optionally, the determining whether the high voltage battery fails or not may include:

determining whether an output voltage of the high voltage battery is out of a preset range, and determining that the high voltage battery fails in case of a positive determination.

Optionally, the power system of the electric vehicle may include two sets of the auxiliary drive motors and the electronic controllers for the auxiliary drive motors, including a set of oil pump motor and electronic controller for the oil pump motor and a set of air pump motor and electronic controller for the air pump motor, where the two sets of the auxiliary drive motors and the electronic controllers for the auxiliary drive motors operate independently.

According to the above technical solution of the present disclosure, the low voltage winding of the auxiliary drive motor and the low voltage electronic controller that matches the low voltage winding are provided in the power system, without arranging a DC/DC converter. The low voltage winding and the low voltage electronic controller are powered by the low voltage storage battery. The low voltage electronic controller has two control modes, one is the rotation speed closed loop mode which ensures the auxiliary drive motor to operate constantly by rotating at a constant speed when the high voltage battery fails; the other is the torque control mode in which the low voltage storage battery is charged when the high voltage battery is normal.

The above description is merely a brief description of the technical solution according to the present disclosure. For the purpose of a clear description of the above and other objectives, features and advantages of this disclosure and a clear understanding of the technical means of the present disclosure, embodiments of the present disclosure are described hereinafter, such that the solution can be implemented in accordance with the contents of the specification.

BRIEF DESCRIPTION OF THE DRAWINGS

According to the description of the embodiments, various advantages and technical effects will become apparent to those skilled in the art. The drawings are only for the purpose of illustrating the embodiments and are not intended to limit this disclosure. Throughout the drawings, the same reference numerals refer to the same elements.

DETAILED DESCRIPTION OF THE EMBODIMENTS

Hereinafter, the technical solution according to embodiments of the present disclosure will be described clearly and fully in conjunction with the drawings. Apparently, the described embodiments are only some rather than all embodiments according to the present disclosure. Various embodiments can be obtained by those skilled in the art based on the embodiments in the present disclosure without any creative work.

Figure 1:
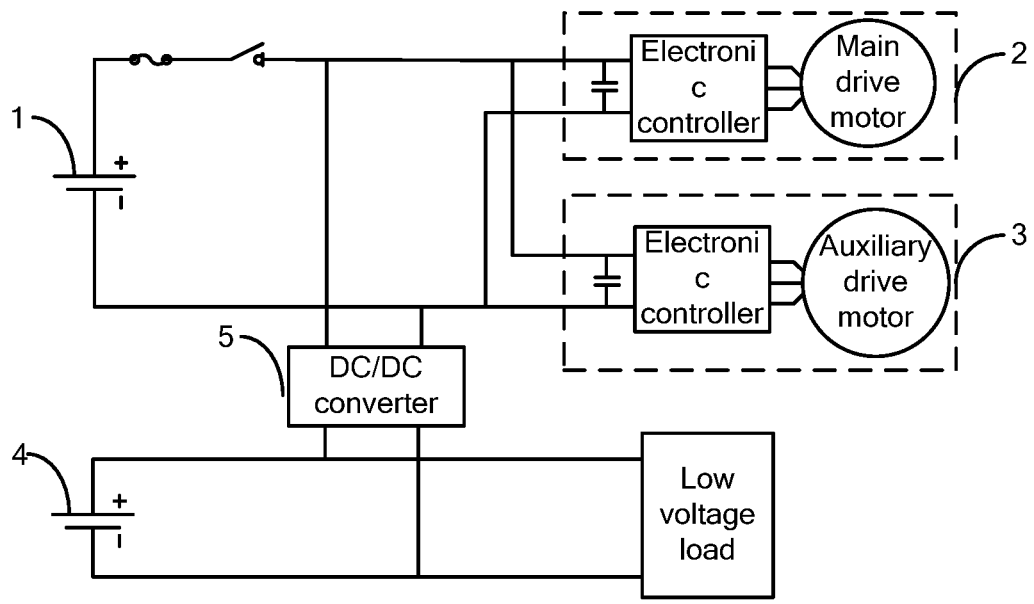
FIG. 1 is a structural schematic diagram of a related power system of an electric vehicle.

As illustrated in FIG. 1, a conventional electric vehicle power system mainly includes a high voltage battery 1, a main drive motor and an electronic controller for the main drive motor 2, an auxiliary drive motor and an electronic controller for the auxiliary drive motor 3. The electronic controller is a motor drive and control system that is connected between a battery and a motor. The main drive motor and electronic controller for the main drive motor refers to the main drive motor and the electronic controller that matches the main drive motor, and the auxiliary drive motor and electronic control refers to the auxiliary drive motor and the electronic controller that matches the auxiliary drive motor. The main drive motor and the electronic controller therefor, and the auxiliary drive motor and the electronic controller therefor are both powered by the high voltage battery 1. In addition, the whole vehicle also includes a low voltage storage battery 4 to supply power to low voltage loads, and the high voltage battery 1 charges the low voltage storage battery 4 through a DC/DC converter 5.

Figure 2:
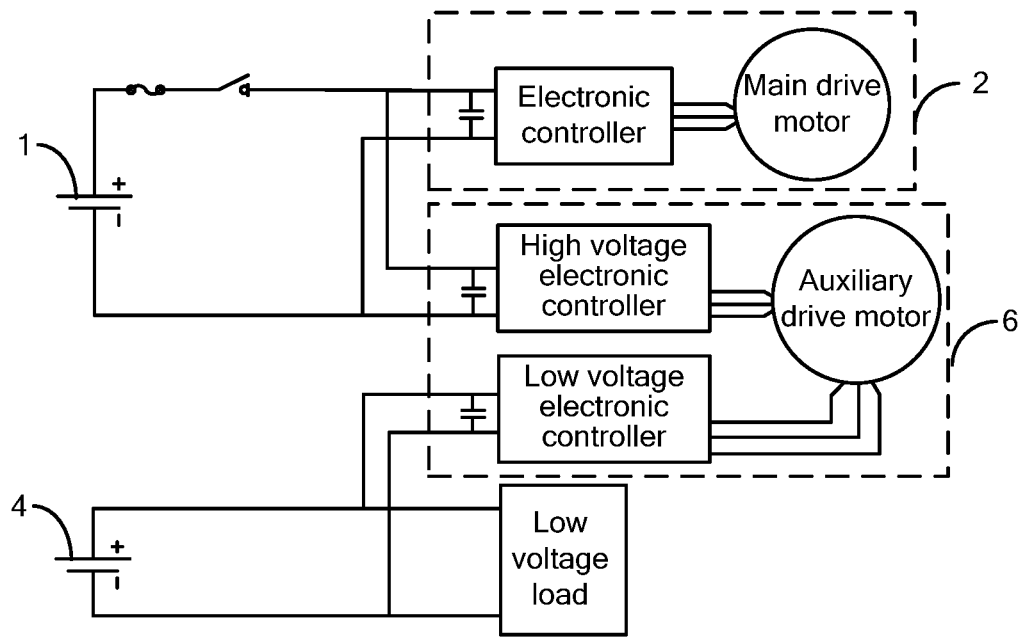
FIG. 2 is a structural schematic diagram of a power system of an electric vehicle according to an embodiment of the present disclosure.

It can be known that both the main drive motor and the auxiliary drive motor in FIG. 1 only have high voltage windings, and the electronic controllers of the two motors are high voltage electronic controllers that match the high voltage windings respectively. According to an embodiment of the present disclosure, a novel power system of an electric vehicle whose topological structure illustrated in FIG. 2 is provided on the basis of the topological structure illustrated in FIG. 1. Compared with the topological structure of FIG. 1, a low voltage winding of an auxiliary drive motor and an electronic controller that matches the low voltage winding are added and the DC/DC converter 5 is omitted in the topological structure of FIG. 2.

As shown in FIG. 2, the topological structure includes a high voltage battery 1, a low voltage storage battery 4, a main drive motor and an electronic controller for the main drive motor 2, and an auxiliary drive motor and an electronic controller for the auxiliary drive motor 6 after improvement.

The main drive motor and the electronic controller therefor 2 is powered by the high voltage battery 1, which means that the main drive motor in the main drive motor and the electronic controller therefor 2 only has a high voltage winding. The electronic controller of the main drive motor connects the high voltage battery 1 and the high voltage winding of the main drive motor;

In the auxiliary drive motor and the electronic controller therefor 6, the auxiliary drive motor includes a high voltage winding and a low voltage winding, and the electronic controller for the auxiliary drive motor includes a high voltage electronic controller and a low voltage electronic controller. The high voltage electronic controller of the auxiliary drive motor is an electronic controller for connecting the high voltage battery 1 and the high voltage winding of the auxiliary drive motor, and the low voltage electronic controller of the auxiliary drive motor is an electronic controller for connecting the low voltage storage battery 2 and the low voltage winding of the auxiliary drive motor.

The low voltage electronic controller of the auxiliary drive motor is configured to operate in a rotation speed closed loop mode when determining that the high voltage battery 1 fails, and to operate in a torque control mode to charge the low voltage storage battery 4 when the high voltage battery 1 is normal and state of charge, SOC, of the low voltage storage battery 4 is lower than a first preset value.

The working principle of the topological structure in FIG. 2 is described hereinafter.

A power supply manner and a control mode of the main drive motor and the electronic controller 2 are the same with those of the topological structure illustrated in FIG. 1, which are not repeated herein.

The high voltage winding and low voltage winding of the auxiliary drive motor are respectively oriented in different rotating coordinate systems, each of which is independently controlled by a set of electronic controller. The high voltage winding is controlled by the high voltage electronic controller, and the low voltage winding is controlled by the low voltage electronic controller. A power supply manner and a control mode of the high voltage winding of the auxiliary drive motor are the same as those of the topological structure illustrated in FIG. 1. The high voltage winding of the auxiliary drive motor is powered by the high voltage battery 1, and the high voltage electronic controller operated in the rotation speed closed loop mode. The low voltage winding of the auxiliary drive motor is powered by the low voltage storage battery 4, and the low voltage electronic controller has two control modes described below.

One control mode is the rotation speed closed loop mode, said rotation speed closed loop mode is adopted only when the high voltage battery 1 fails. Specifically, when the high voltage battery 1 fails, both the high voltage electronic controller of the auxiliary drive motor and the electronic controller of the main drive motor stop operating. The auxiliary drive motor runs in an electric motoring state under the rotation speed closed loop control of the low voltage electronic controller (that is, the low voltage electric controller is configured to convert electric energy of the low voltage storage battery 4 into mechanical energy of the auxiliary drive motor), such that the auxiliary drive motor can still operate constantly by rotating at a constant speed to avoid a safety risk when the high voltage battery 1 fails.

The other control mode is the torque control mode, said torque control mode is adopted only when the high voltage battery 1 is normal and the state of charge of the low voltage storage battery 4 is lower than the first preset value. Specifically, when the high voltage battery 1 is normal and the low voltage storage battery 4 needs to be charged, the auxiliary drive motor operates constantly by rotating at a constant speed under the rotation speed closed loop control of the high voltage electronic controller, which means that the high voltage electronic controller is configured to convert the electric energy of the high voltage storage battery 4 into the mechanical energy of the auxiliary drive motor. Meanwhile, the low voltage controller operates in the torque control mode, and a torque value of the low voltage controller is obtained by dividing a charging power required by the low voltage storage battery 4 by a current rotation speed of the auxiliary drive motor and then multiplying by a coefficient. The torque value is a negative value. For the low voltage electronic controller and the low voltage winding of the auxiliary drive motor, the torque value is for power generation. The low voltage electronic controller can convert the mechanical energy of the auxiliary drive motor into a direct current to charge the low voltage storage battery 4, such that the state of charge of the low voltage storage battery 4 can always be kept in a reasonable range.

Optionally, the low voltage electronic controller no longer operates in the torque control mode when the state of charge of the low voltage storage battery 4 is charged to be not lower than the first preset value (for example, the low voltage storage battery is fully charged), so as to avoid overcharging the low voltage storage battery 4. In such case, the low voltage electronic controller does not operate in any one of the two control modes.

Optionally, in order to avoid the low voltage electronic controller from frequently entering and exiting the torque control mode due to a frequent fluctuation of the state of charge of the low voltage storage battery 4 near the first preset value, according to an embodiment of the present disclosure, a hysteresis range is set when determining whether the state of charge of the low voltage storage battery 4 satisfies the requirement. When the state of charge of the low voltage storage battery 4 is lower than the first preset value, the low voltage electronic controller operates in the torque control mode, and when the low voltage storage battery is charged until the state of charge of the low voltage storage battery 4 is higher than a second preset value, the low voltage electronic controller exits the torque control mode, where the second preset value is greater than the first preset value.

The failure of the high voltage battery 1 according to the embodiment includes a disconnection of an output circuit of the high voltage battery 1 due to an internal fault or other fault of the high voltage battery 1. The determining whether the high voltage battery 1 fails or not may be performed by, for example, determining whether an output voltage of the high voltage battery 1 is lower than a third preset value. The high voltage battery 1 is determined to have a fault in case of a positive determination, and otherwise, the high voltage battery 1 is determined to be normal.

Figure 3:
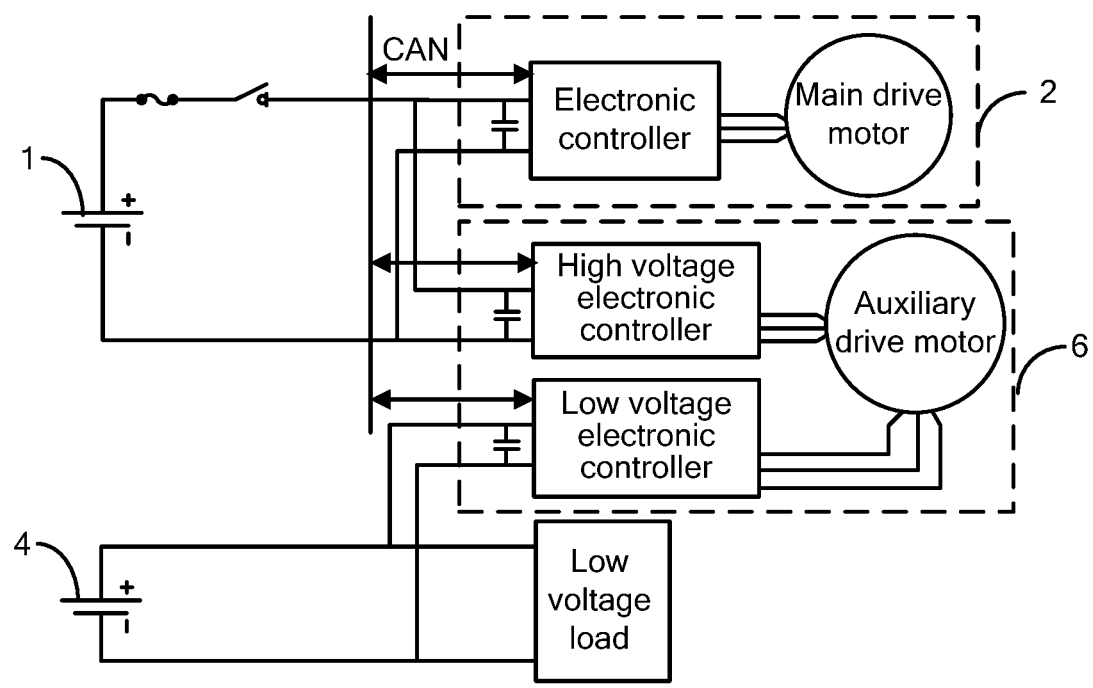
FIG. 3 is a schematic diagram of a controller area network, CAN, bus adapted to the power system of the electric vehicle in FIG. 2.

The high voltage electronic controller of the auxiliary drive motor, the low voltage electronic controller of the auxiliary drive motor, and the electronic controller of the main drive motor communicate with each other to transmit corresponding data information. For example, the electronic controller of the main drive motor transmits the output voltage of the high voltage battery 1 to the low voltage electronic controller of the auxiliary drive motor. The communication mode includes, but not limited to, CAN bus communication. In FIG. 3, the CAN bus communication is used as an example.

The power system of the electric vehicle includes two sets of auxiliary drive motors and electronic controllers for the auxiliary drive motors 6, where one set includes an oil pump motor and an electronic controller for oil pump motor, and the other set includes an air pump motor and an electronic controller for the air pump motor. In a case that the oil pump motor and/or the electronic controller therefor stop running, it may cause a difficulty in vehicle steering. In a case that the air pump motor and/or electronic controller therefor stop running, it may cause a vehicle brake failure. According to an embodiment of the present disclosure, the two sets of auxiliary drive motors and the electronic controllers therefor operate independently, such that a vehicle brake and a power-assisted steering system can continue working in a case that the high voltage battery 1 fails, and the vehicle can be decelerated and parked at roadside to ensure personal safety.

In view of above, according to the above technical solution of the present disclosure, the low voltage winding of the auxiliary drive motor and the low voltage electronic controller that matches the low voltage winding are added, while omitting a DC/DC converter when compared with the topological structure as shown in FIG. 1. The low voltage winding and the low voltage electronic controller are powered by the low voltage storage battery. The low voltage electronic controller has two control modes, one is the rotation speed closed loop mode which ensures the auxiliary drive motor to operate constantly by rotating at a constant speed when the high voltage battery fails; the other is the torque control mode in which the low voltage storage battery is charged when the high voltage battery is normal.

In addition, according to an embodiment of the present disclosure, an electronic vehicle including any one of the power systems of the electronic vehicle described earlier is provided, so as to avoid an instantaneous stopping of the auxiliary drive motor and the electronic controller therefor when the high voltage battery fails.

According an embodiment of the present disclosure, a method for controlling a power system of an electric vehicle is provided. As illustrated in FIG. 2, the power system of the electric vehicle includes a high voltage battery 1, a low voltage storage battery 4, a main drive motor and an electronic controller for the main drive motor 2, and an auxiliary drive motor and an electronic controller for the auxiliary drive motor 6. The main drive motor and the electronic controller therefor 2 is powered by the high voltage battery 1. n the auxiliary drive motor and the electronic controller therefor 6, the auxiliary drive motor includes a high voltage winding and a low voltage winding, and the electronic controller of the auxiliary drive motor includes a high voltage electronic controller and a low voltage electronic controller. The high voltage electronic controller of the auxiliary drive motor is an electronic controller for connecting the high voltage battery 1 and the high voltage winding of the auxiliary drive motor, and the low voltage electronic controller of the auxiliary drive motor is an electronic controller for connecting the low voltage storage battery 2 and the low voltage winding of the auxiliary drive motor. Generally, the power system of the electric vehicle includes two sets of auxiliary drive motors and electronic controllers for the auxiliary drive motors, where one set includes an oil pump motor and an electronic controller for the oil pump motor, and the other set includes an air pump motor and an electronic controller for the air pump motor. The two sets of auxiliary drive motors and the electronic controllers for the auxiliary drive motors operate independently.

Figure 4:
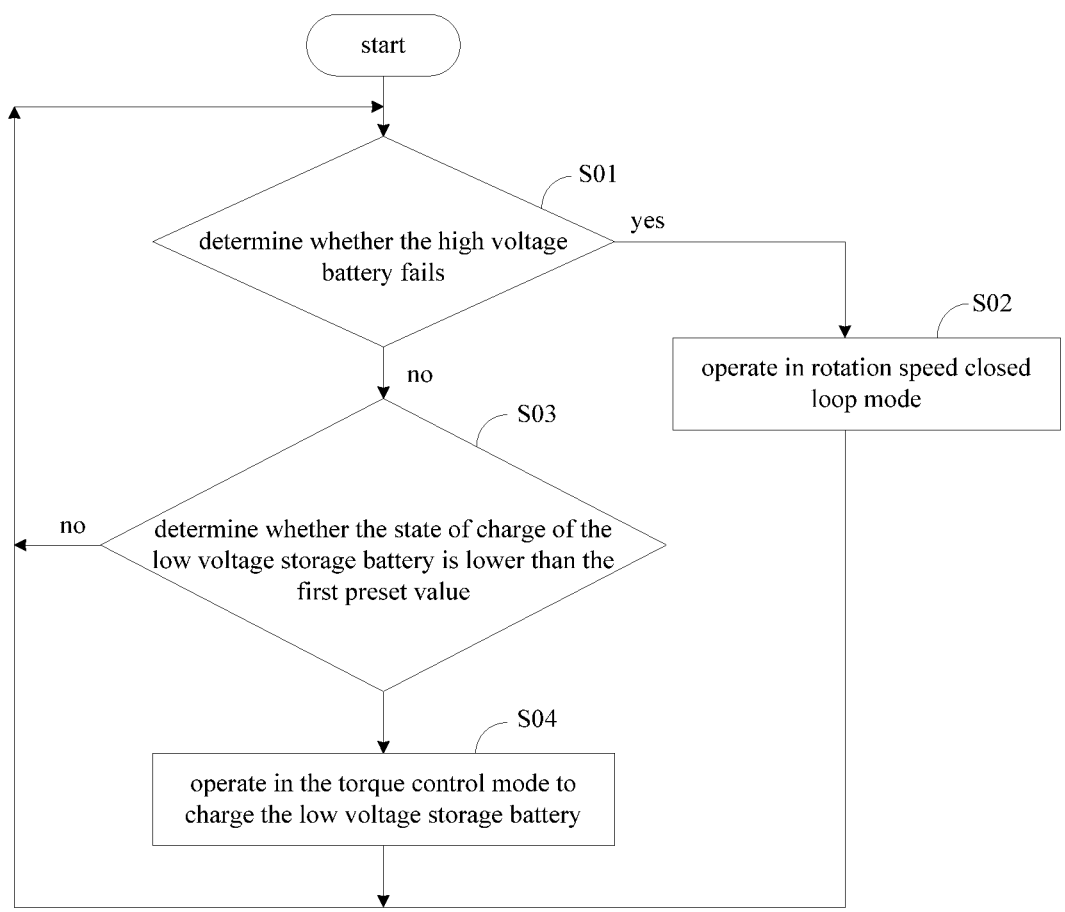
FIG. 4 is a flow chart of a method for controlling a power system of an electric vehicle according to an embodiment of the present disclosure.

The method is applied to the low voltage electronic controller of the auxiliary drive motor. As illustrated in FIG. 4, the method includes steps S01 to S04.

In step S01, whether the high voltage battery fails or not is determined. If the high voltage battery is determined to be faulty, step S02 is performed; otherwise, if the high voltage battery is determined to be normal, step S03 is performed.

The determining whether the high voltage battery 1 fails or not may include determining whether an output voltage of the high voltage battery 1 is out of a preset range. The high voltage battery 1 is determined to have a fault in case of a positive determination, and otherwise, the high voltage battery 1 is determined to be normal.

In step S02, the low voltage electronic controller of the auxiliary electronic controller operates in a rotation speed closed loop mode. When operating in this mode, the method returns to step S01 to start a next round of determination.

In step S03, whether the state of charge of the low voltage storage battery 4 is lower than a first preset value is determined. If the state of charge of the low voltage storage battery 4 is lower than the first preset value, step S04 is performed; otherwise, the method returns to step S01 to start a next round of determination.

In step S04, the low voltage electronic controller of the auxiliary electronic controller operates in a torque control mode to charge the low voltage storage battery 4. When operating in this mode, the method returns to step S01 to start a next round of determination.

Figure 5:
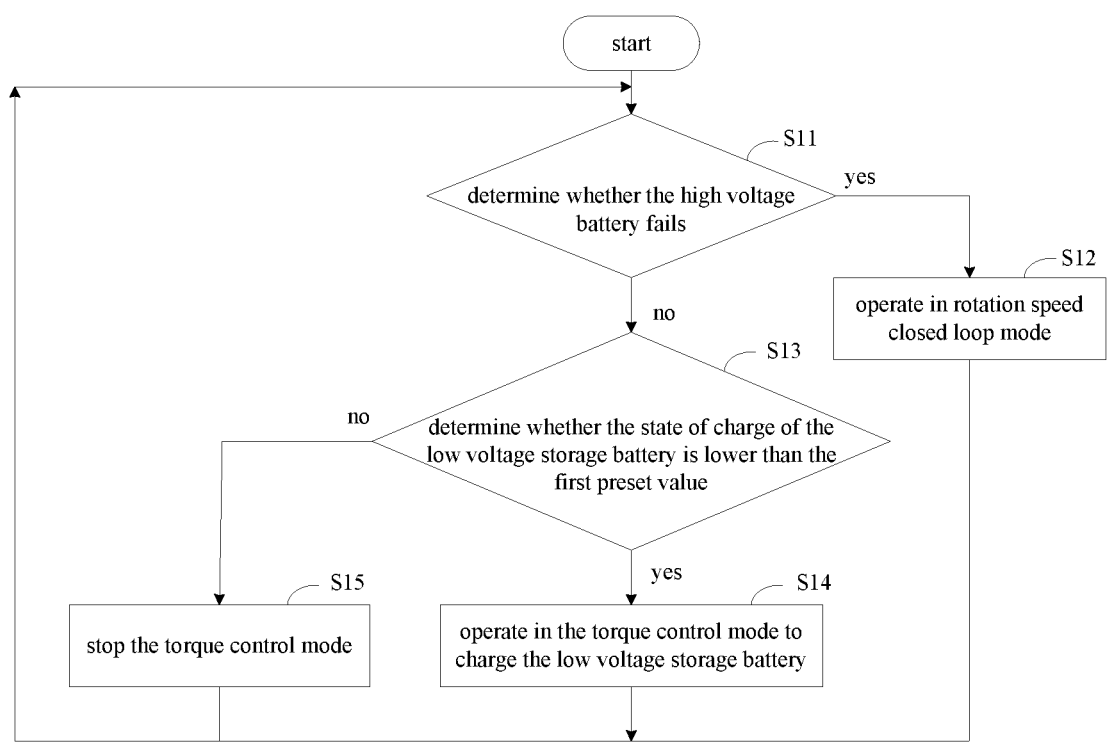
FIG. 5 is another flow chart of a control method for a power system of an electric vehicle according to an embodiment of the present disclosure.

In addition, according to an embodiment of the present disclosure, a control method including steps S11 to S15 as illustrated in FIG. 5 is further provided.

In step S11, whether the high voltage battery fails or not is determined. If the high voltage battery is determined to be faulty, step S12 is performed; otherwise, if the high voltage battery is determined to be normal, step S13 is performed.

In step S12, the low voltage electronic controller of the auxiliary electronic controller operates in the rotation speed closed loop mode. And then the method returns to step S11 to start a next round of determination.

In step S13, whether the state of charge of the low voltage storage battery 4 is lower than the first preset value is determined. If the state of charge of the low voltage storage battery 4 is lower than the first preset value, step S14 is performed; otherwise, if the state of charge of the low voltage storage battery 4 is not lower than the first preset value, step S15 is performed.

In step S14, the low voltage electronic controller of the auxiliary electronic controller operates in the torque control mode to charge the low voltage storage battery 4. And then the method returns to step S11 to start a next round of determination.

In step S15, the low voltage electronic controller of the auxiliary electronic controller exits the torque control mode, and then the method returns to step S11 to start the next round of determination.

Compared with the technical solution illustrated in FIG. 4, in the technical solution illustrated in FIG. 5, when the state of charge of the low voltage storage battery 4 is determined to be not lower than the first preset value, the low voltage of the auxiliary electronic controller stops running in the torque control mode, such that the low voltage storage battery 4 can avoid being overcharged.

Figure 6:
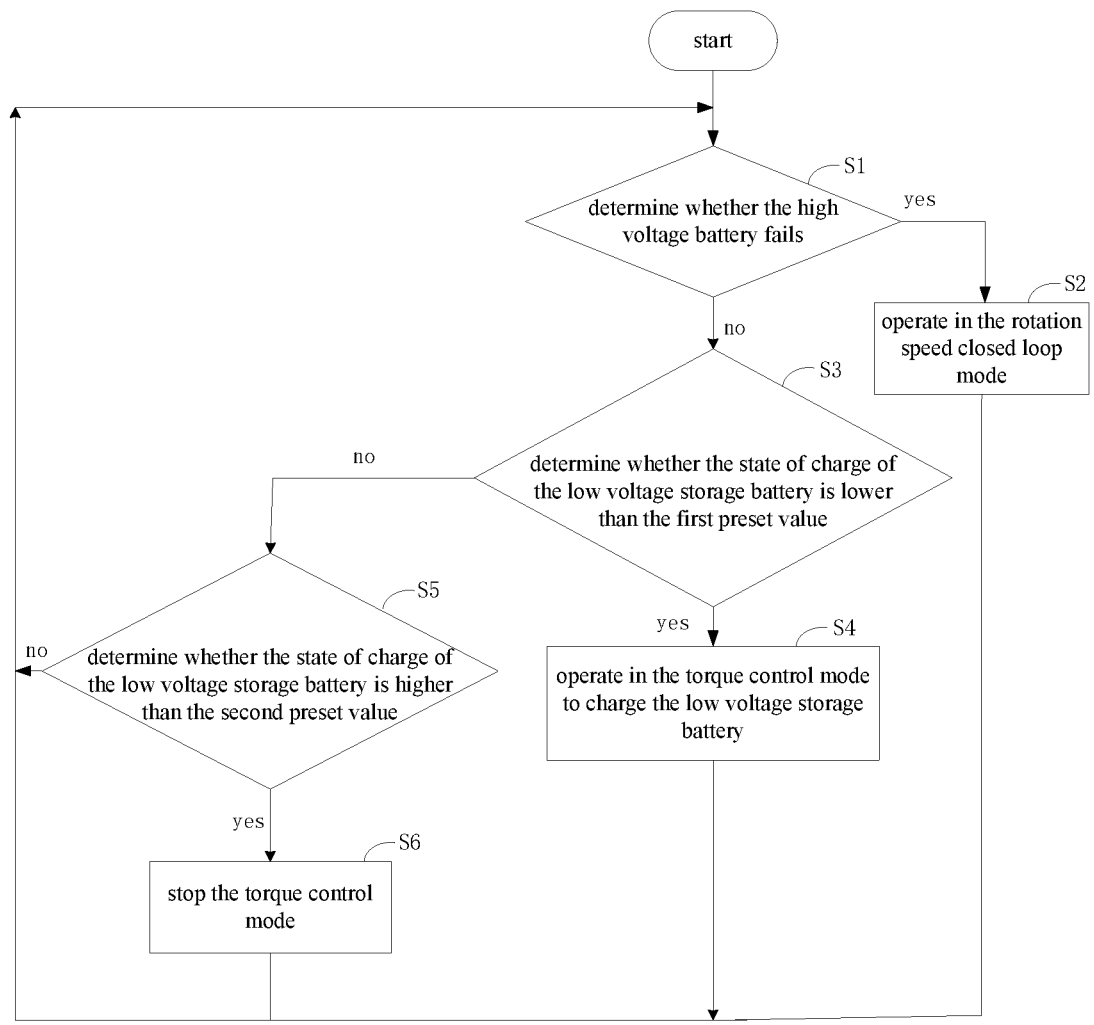
FIG. 6 is still another flow chart of a control method for a power system of an electric vehicle according to an embodiment of the present disclosure.

Optionally, according to an embodiment of the present disclosure, in order to avoid the low voltage electronic controller from frequently entering and exiting the torque control mode due to a frequent fluctuation of the state of charge of the low voltage storage battery 4 in vicinity of the first preset value, a still further control method based on any one of the above method embodiments is provided. In the control method, a hysteresis range is set for the step of determining whether the state of charge of the low voltage storage battery 4 satisfies a requirement. Correspondingly, as illustrated in FIG. 6, the control method includes steps S1 to S6.

In step S1, whether the high voltage battery fails or not is determined. If the high voltage battery is determined to be faulty, step S2 is performed; otherwise, if the high voltage battery is determined to be normal, step S3 is performed.

In step S2, the low voltage electronic controller of the auxiliary electronic controller operates in the rotation speed closed loop mode. And then the control method returns to step S1 to start a next round of determination.

In step S3, whether the state of charge of the low voltage storage battery 4 is lower than a first preset value is determined. If the state of charge of the low voltage storage battery 4 is lower than the first preset value, step S4 is performed, otherwise, step S5 is performed.

In step S4, the low voltage electronic controller of the auxiliary electronic controller operates in the torque control mode to charge the low voltage storage battery 4. And then the control method returns to step S1 to start a next round of determination.

In step S5, whether the state of charge of the low voltage storage battery 4 is higher than a second preset value is determined. Step S6 is performed in case of a positive determination, otherwise, the control method returns to step S1.

In step S6, the low voltage electronic controller of the auxiliary electronic controller exits the torque control mode, and then the control method returns to step S11 to start a next round of determination.

In view of above, according to the above technical solution of the present disclosure, the low voltage winding of the auxiliary drive motor and the low voltage electronic controller that matches the low voltage winding are added, while omitting a DC/DC converter when compared with the topological structure as shown in FIG. 1. The low voltage winding and the low voltage electronic controller are powered by the low voltage storage battery. The low voltage electronic controller has two control modes, one is the rotation speed closed loop mode which ensures the auxiliary drive motor to operate constantly by rotating at a constant speed when the high voltage battery fails; the other is the torque control mode in which the low voltage storage battery is charged when the high voltage battery is normal.

It should be noted that the embodiments in this specification are all described in a progressive manner. Description of each of the embodiments focuses on differences from other embodiments, and reference may be made to each other for the same or similar parts among respective embodiments. The method embodiments are substantially similar to the apparatus embodiments and therefore are only briefly described, and reference may be made to the description of the power system of the electric vehicle for the associated part.

The embodiments of the control system described above are only for illustrative purposes, the units described as separate parts may or may not be physically separate, and elements described as units may or may not be physical units, said elements may be located in one position, or may be distributed on a plurality of network units. Some or all of the units may be selected according to actual requirements to achieve the objectives of the solutions of the embodiments. Those skilled in the art can understand and perform the above technical solution without any creative work.

It should be further noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements defined therein but also other elements that are not enumerated, or in addition, includes elements inherent for the process, method, article or device. Unless expressively limited otherwise, the statement "comprising (including) one . . . " does not exclude the case that other similar elements may be included in the process, method, article or device.

The above description of examples according to the present disclosure is only intended to help those skilled in the art to implement and use the present disclosure. Various modifications and improvements that can be made to the embodiments of the present disclosure are obvious to those skilled in the art. The general principle of this disclosure can be implemented in other embodiments without departing from the principle or scope of the present disclosure. The embodiments of the present disclosure are not intended to limit the protection scope of the present disclosure which is consistent with the broadest scope in accordance with the principles and novel features of the present disclosure.

The invention claimed is:

1. A power system of an electric vehicle, comprising:
a high voltage battery,
a low voltage storage battery,
a main drive motor and an electronic controller for the main drive motor, and
an auxiliary drive motor and an electronic controller for the auxiliary drive motor,
wherein the main drive motor and the electronic controller for the main drive motor are powered by the high voltage battery;
wherein the auxiliary drive motor comprises a high voltage winding and a low voltage winding;
wherein the electronic controller of the auxiliary drive motor comprises a high voltage electronic controller and a low voltage electronic controller, wherein the high voltage battery and the high voltage winding of the auxiliary drive motor are connected via the high voltage electronic controller of the auxiliary drive motor, and the low voltage storage battery and the low voltage winding of the auxiliary drive motor are connected via the low voltage electronic controller of the auxiliary drive motor; and
wherein the low voltage electronic controller of the auxiliary drive motor is configured to:
operate in a rotation speed closed loop mode in response to determining that the high voltage battery fails, and
operate in a torque control mode to charge the low voltage storage battery in response to determining that the high voltage battery is normal and a state of charge of the low voltage storage battery is lower than a first preset value.

2. The power system of the electric vehicle according to claim 1, wherein the low voltage electronic controller of the auxiliary drive motor is further configured to stop the torque control mode in response to determining that the high voltage battery is normal and the state of charge of the low voltage storage battery is not lower than the first preset value.

3. The power system of the electric vehicle according to claim 1, wherein the low voltage electronic controller of the auxiliary drive motor is further configured to stop the torque control mode in response to determining that the high voltage battery is normal and the state of charge of the low voltage is higher than a second preset value, wherein the second preset value is greater than the first preset value.

4. The power system of the electric vehicle according to claim 1, wherein the low voltage electronic controller of the auxiliary drive motor is configured to determine that the high voltage battery fails in response to determining that an output voltage of the high voltage battery is out of a preset range.

5. The power system of the electric vehicle according to claim 1, wherein the power system of the electric vehicle comprises two sets of the auxiliary drive motors and the electronic controllers for the auxiliary drive motors, including a set of oil pump motor and electronic controller for the oil pump motor and a set of air pump motor and electronic controller for the air pump motor, wherein the two sets of the auxiliary drive motors and electronic controllers for the auxiliary drive motors operate independently.

6. A method for controlling a power system of an electric vehicle, wherein the power system of the electric vehicle comprises a high voltage battery, a low voltage storage battery, a main drive motor and an electronic controller for the main drive motor, and an auxiliary drive motor and an electronic controller for the auxiliary drive motor, wherein the main drive motor and the electronic controller for the main drive motor are powered by the high voltage battery; wherein the auxiliary drive motor comprises a high voltage winding and a low voltage winding; wherein the electronic controller of the auxiliary drive motor comprises a high voltage electronic controller and a low voltage electronic controller, wherein the high voltage battery and the high voltage winding of the auxiliary drive motor are connected via the high voltage electronic controller of the auxiliary drive motor, and the low voltage storage battery and the low voltage winding of the auxiliary drive motor are connected via the low voltage electronic controller of the auxiliary drive motor;

the method comprises:

determining whether the high voltage battery fails or not;

controlling the low voltage controller of the auxiliary drive motor to operate in a rotation speed closed loop mode in response to determining that the high voltage battery fails;

determining whether state of charge of the low voltage storage battery is lower than a first preset value in response to determining that the high voltage battery is normal; and controlling the low voltage controller of the auxiliary drive motor to operate in a torque control mode to charge the low voltage storage battery in response to determining that the state of charge of the low voltage storage battery is lower than the first preset value.

7. The method according to claim 6, wherein after the determining whether the state of charge of the low voltage storage battery is lower than the first preset value, the method further comprises:

stopping the torque control mode in response to determining that the state of charge of the low voltage storage battery is not lower than the first preset value.

8. The method according to claim 6, wherein after the determining whether the state of charge of the low voltage storage battery is lower than the first preset value, the method further comprises:

stopping the torque control mode in response to determining that the high voltage battery is normal and the state of charge of the low voltage is higher than a second preset value, wherein the second preset value is greater than the first preset value.

9. The method according to claim 6, wherein the determining whether the high voltage battery fails or not comprises:

determining whether an output voltage of the high voltage battery is out of a preset range, and determining that the high voltage battery fails in case of a positive determination.

10. The method according to claim 6, wherein the power system of the electric vehicle comprises two sets of the auxiliary drive motors and the electronic controllers for the auxiliary drive motors, including a set of oil pump motor and electronic controller for the oil pump motor and a set of air pump motor and electronic controller for the air pump motor, wherein the two sets of the auxiliary drive motors and the electronic controllers for the auxiliary drive motors operate independently.

11. An electric vehicle, comprising a power system, the power system comprising:

a high voltage battery, a low voltage storage battery, a main drive motor and an electronic controller for the main drive motor, and an auxiliary drive motor and an electronic controller for the auxiliary drive motor, wherein the main drive motor and the electronic controller for the main drive motor are powered by the high voltage battery;

wherein the auxiliary drive motor comprises a high voltage winding and a low voltage winding;

wherein the electronic controller of the auxiliary drive motor comprises a high voltage electronic controller and a low voltage electronic controller, wherein the high voltage battery and the high voltage winding of the auxiliary drive motor are connected via the high voltage electronic controller of the auxiliary drive motor, and the low voltage storage battery and the low voltage winding of the auxiliary drive motor are connected via the low voltage electronic controller of the auxiliary drive motor; and wherein the low voltage electronic controller of the auxiliary drive motor is configured to:

operate in a rotation speed closed loop mode in response to determining that the high voltage battery fails, and operate in a torque control mode to charge the low voltage storage battery in response to determining that the high voltage battery is normal and a state of charge of the low voltage storage battery is lower than a first preset value.

12. The electric vehicle according to claim 11, wherein the low voltage electronic controller of the auxiliary drive motor is further configured to stop the torque control mode in response to determining that the high voltage battery is normal and the state of charge of the low voltage storage battery is not lower than the first preset value.

13. The electric vehicle according to claim 11, wherein the low voltage electronic controller of the auxiliary drive motor is further configured to stop the torque control mode in response to determining that the high voltage battery is normal and the state of charge of the low voltage is higher than a second preset value, wherein the second preset value is greater than the first preset value.

14. The electric vehicle according to claim 11, wherein the low voltage electronic controller of the auxiliary drive motor is configured to determine that the high voltage battery fails in response to determining that an output voltage of the high voltage battery is out of a preset range.

15. The electric vehicle according to claim 11, wherein the power system comprises two sets of the auxiliary drive motors and the electronic controllers for the auxiliary drive motors, including a set of oil pump motor and electronic controller for the oil pump motor and a set of air pump motor and electronic controller for the air pump motor, wherein the two sets of the auxiliary drive motors and electronic controllers for the auxiliary drive motors operate independently.

* * * * *